B. WOODCOCK.
Plow.
No. 13. A. I. Patented Sept. 20, 1838.
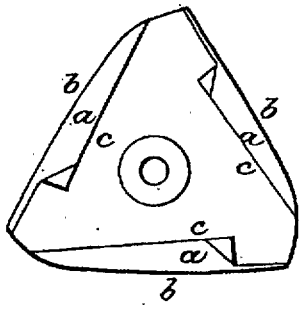

UNITED STATES PATENT OFFICE.

BANCROFT WOODCOCK, OF MOUNT PLEASANT, PENNSYLVANIA.

IMPROVEMENT IN PLOWS.

Specification forming part of Letters Patent No. 233, dated June 14, 1837; Additional Improvement No. 13, dated Sept. 26, 1838

*To all whom it may concern:*

Whereas I, BANCROFT WOODCOCK, of Mount Pleasant, in the county of Westmoreland and State of Pennsylvania, did on the 14th day of June, 1837, obtain Letters Patent of the United States for certain Improvements in Plows; and whereas I have since that date made an improvement in that part of my said plow which I denominate the "reversing-cutter," and which I have described as being received into a recess on the landside; now, be it known that for the purpose of having my improvement in said reversing-cutter added to the above-named Letters Patent, so as to make part and parcel thereof, I do hereby declare that the following is a full and exact description of my new improvement thereon.

As described in the above-named Letters Patent, my reversing-cutter was made flat on that side which fitted into the recess on the landside which was made to receive it; but I now cast it with three projections, *a a a*, on its three cutting edges, rising in a regular slope from each of the cutting-edges, and undercut at each of the edges, so as to slip over upon the front edge of the landside, and thus to protect it completely from being worn in use, and at the same time to hold the reversing-cutter in place more securely than before. Instead of fastening the reversing-cutter by a wedge, as formerly, I now fasten it by means of a screw the head of which is countersunk, having found this to be preferred. I of course cast recesses on the landside to admit two of the projections *a a*, while the third is in use as a part of the cutting-edge.

What I claim as constituting my present improvement is—

The forming of the projections *a a a* upon my said reversing-cutter in the manner set forth, to slip over upon and protect the fore edges of the landside.

BANCROFT WOODCOCK.

Witnesses:

LINTON THORN,

C. H. BITSBERGER.